(12) United States Patent
Wang et al.

(10) Patent No.: US 11,012,936 B2
(45) Date of Patent: May 18, 2021

(54) SYSTEMS AND METHODS FOR DYNAMIC ADJUSTMENT OF INTERMITTENT RECEPTION PARAMETERS IN A RADIO ACCESS NETWORK

(71) Applicant: Verizon Patent and Licensing Inc., Arlington, VA (US)

(72) Inventors: Xin Wang, Morris Plains, NJ (US); Nanjun Qian, Princeton, NJ (US); Nischal Patel, Gilberts, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/654,992

(22) Filed: Oct. 16, 2019

(65) Prior Publication Data
US 2021/0120490 A1    Apr. 22, 2021

(51) Int. Cl.
*H04W 52/02* (2009.01)
*H04W 72/12* (2009.01)
*H04W 24/08* (2009.01)
*H04W 76/28* (2018.01)

(52) U.S. Cl.
CPC ....... *H04W 52/0216* (2013.01); *H04W 24/08* (2013.01); *H04W 52/0229* (2013.01); *H04W 72/1205* (2013.01); *H04W 72/1289* (2013.01); *H04W 76/28* (2018.02)

(58) Field of Classification Search
USPC ........................................................ 370/311
See application file for complete search history.

(56) References Cited

U.S. PATENT DOCUMENTS

| 2010/0120378 A1* | 5/2010 | Harada | H04W 76/28 455/88 |
| 2010/0130216 A1* | 5/2010 | Harada | H04W 72/1289 455/450 |
| 2010/0135209 A1* | 6/2010 | Harada | H04W 76/28 370/328 |
| 2010/0135231 A1* | 6/2010 | Harada | H04W 52/0225 370/329 |
| 2011/0039536 A1* | 2/2011 | Lee | H04W 76/28 455/422.1 |

(Continued)

OTHER PUBLICATIONS

3GPP TS 38.321 V15.6.0 (Jun. 2019), "3rd Generation Partnership Project; Technical Specification Group Radio Acces Network; NR; Medium Access Control (MAC) protocol specification (Release 15)," Jun. 2019.

(Continued)

*Primary Examiner* — Jamaal Henson (57) ABSTRACT

A system described herein may provide a technique for the selection of On Durations, Off Durations, and associated timers for monitoring of downlink traffic for a User Equipment ("UE"). For example, the UE may monitor a Physical Downlink Control Channel ("PDCCH") according to a first set of On and Off Durations associated with a particular profile selected for the UE, and monitor the PDCCH according to a second set of On and Off Durations associated with the particular profile upon expiration of a timer associated with the first set of On and Off Durations. Machine learning or other suitable techniques may be used to refine the selection of On/Off Durations and associated timers in an ongoing process.

20 Claims, 8 Drawing Sheets

(56) References Cited

U.S. PATENT DOCUMENTS

| | | | | |
|---|---|---|---|---|
| 2011/0199984 | A1* | 8/2011 | Umesh | H04W 76/28 370/329 |
| 2013/0294313 | A1* | 11/2013 | Han | H04W 52/0216 370/311 |
| 2013/0308465 | A1* | 11/2013 | Xu | H04L 47/27 370/241 |
| 2014/0247742 | A1* | 9/2014 | Lee | H04W 24/10 370/252 |
| 2019/0373550 | A1* | 12/2019 | Lee | H04L 5/0053 |
| 2020/0067664 | A1* | 2/2020 | Kim | H04L 5/0098 |
| 2020/0245395 | A1* | 7/2020 | Zhang | H04L 5/0053 |

OTHER PUBLICATIONS

3GPP TS 38.306 V15.7.0 (Sep. 2019), "3rd Generation Partnership Project; Technical Specification Group Radio Acces Network; NR; User Equipment (UE) radio access capabilities (Release 15)," Sep. 2019.

3GPP TS 38.331 V15.7.0 (Sep. 2019), "3rd Generation Partnership Project; Technical Specification Group Radio Acces Network; NR; Radio Resource Control (RRC) protocol specification (Release 15)," Sep. 2019.

* cited by examiner

SYSTEMS AND METHODS FOR DYNAMIC ADJUSTMENT OF INTERMITTENT RECEPTION PARAMETERS IN A RADIO ACCESS NETWORK

BACKGROUND

Wireless user equipment ("UE"), such as mobile telephones or other wireless communication devices, may receive wireless connectivity via a radio access network ("RAN"). UEs may intermittently communicate with the RAN to determine whether traffic (e.g., downlink traffic) is available for the UE via the RAN. UEs may also "sleep" for some time, during which the UE does not communicate with the RAN to check for new downlink traffic. Typically, communicating with the RAN consumes more power (e.g., battery life or capacity of the UE) than sleeping.

DETAILED DESCRIPTION OF THE PREFERRED EMBODIMENTS

The following detailed description refers to the accompanying drawings. The same reference numbers in different drawings may identify the same or similar elements.

Embodiments described herein provide for the dynamic adjustment of parameters that may be used by a UE to monitor a communication channel between the UE and a wireless network, in order to check whether traffic has been sent to the UE via the wireless network. For example, the UE may monitor a Physical Downlink Control Channel ("PDCCH") between the UE and a base station (e.g., an Evolved Node B ("eNB"), a Next Generation Node B ("gNB"), etc.) on an intermittent or periodic basis to determine whether the base station has traffic available for the UE. The UE may intermittently or periodically "sleep" for some time (e.g., not monitor the PDCCH). As described herein, the intermittent checking for traffic by a UE may be referred to as Intermittent Reception ("IRX").

Sleeping for longer durations may reduce power consumption of the UE, but may reduce performance (e.g., may increase latency and/or otherwise impact performance) than sleeping for shorter durations. On the other hand, sleeping for shorter durations may increase power consumption of the UE, but may potentially enhance performance. Embodiments described herein provide for the balancing of performance and power consumption considerations, by dynamically adjusting IRX parameters, such as how often, and for how long, a UE checks whether traffic is available for the UE (e.g., monitors the PDCCH).

Figure 1:
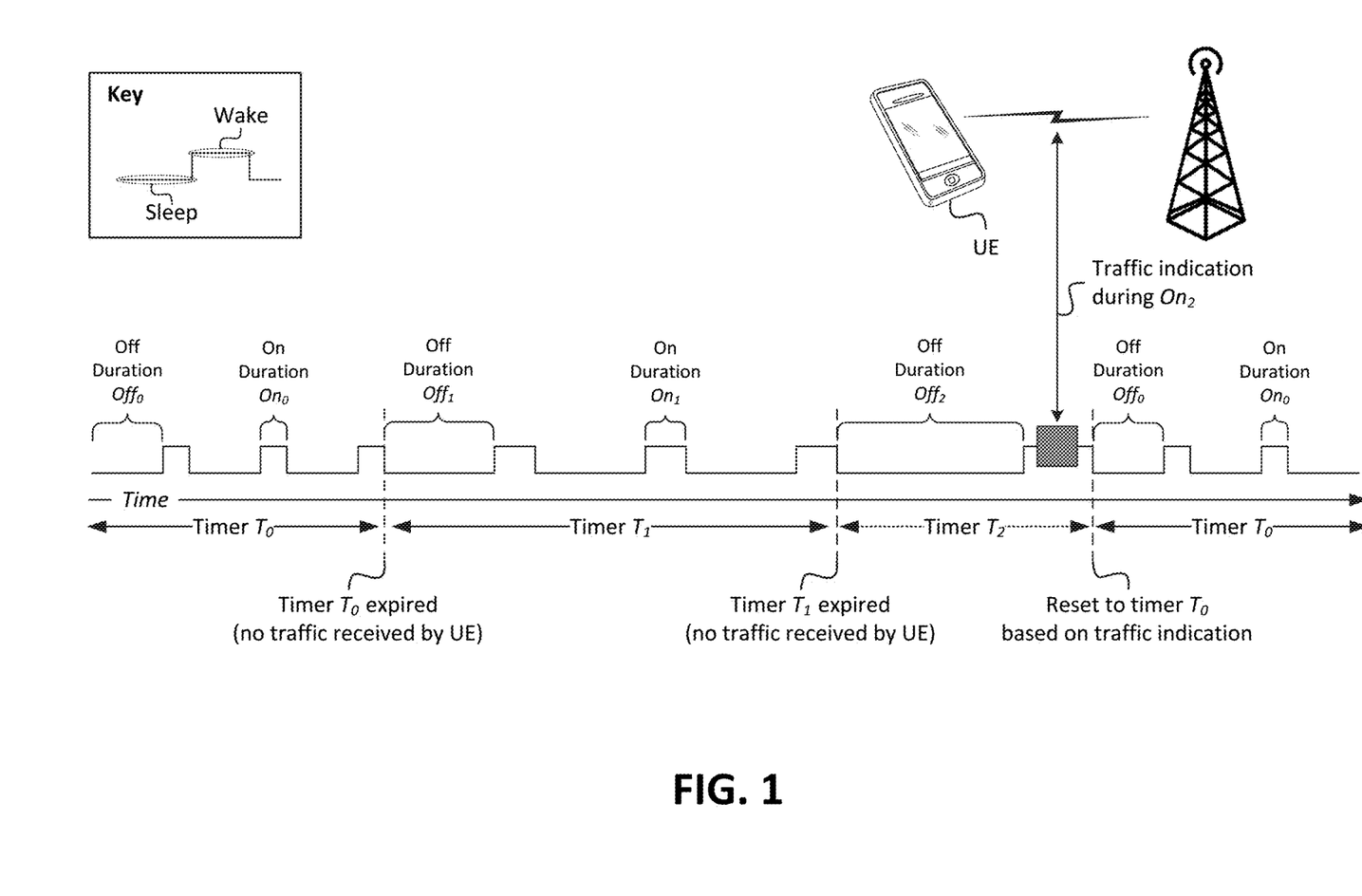
FIG. 1 illustrates an example overview of one or more embodiments described herein, in which Intermittent Reception ("IRX") parameters (e.g., an "On Duration" and/or an "Off Duration") for a UE may be adjusted based on different inactivity timers that may be reset when the UE receives traffic, in accordance with some embodiments described herein.

FIG. 1 depicts, for example, a timeline that illustrates the intermittent sleeping and monitoring by a UE, to determine whether traffic is available for the UE. As shown, for instance, the UE may use three different IRX cycles (i.e., where a first "IRX cycle" is defined by an "Off Duration" $Off_0$, during which the UE sleeps, and an "On Duration" $On_0$, during which the UE checks whether traffic is available for the UE; a second IRX cycle is defined by $Off_1$ and $On_1$; and a third IRX cycle is defined by $Off_2$ and $On_2$). As also shown, each of these IRX cycles may be associated with a different timer (i.e., where the first IRX cycle is associated with timer $T_0$, the second IRX cycle is associated with $T_1$, and the third IRX cycle is associated with $T_2$). While discussed herein in the context of a timer being associated with multiple instances of an On Duration and an Off Duration, in some embodiments, a given timer may be associated with one instance of an On Duration and/or one instance of an Off Duration (e.g., a particular timer may expire after the occurrence of one On Duration and one Off Duration, one On Duration and two Off Durations, two On Durations and one Off Duration, etc.).

As shown, for instance, the UE may sleep during the first instance of Off Duration $Off_0$, and may "wake" to check for traffic during the first instance of On Duration $On_0$. In this example, the receiving of an indication of traffic (also referred to as a "grant") may be denoted by a shaded grey box. Thus, in the example shown, no traffic is available for the UE during the first instance of $On_0$, and the UE sleeps again during the second instance of $Off_0$. As further shown, a first timer $T_0$ may be used to track a duration of time that the UE uses the parameters of the first IRX cycle (i.e., $On_0$ and $Off_0$) to check for traffic. In this example, $T_0$ may expire after three instances of checking for traffic (i.e., after three instances of $On_0$ and $Off_0$).

After the expiration of $T_0$, in accordance with some embodiments, the UE may use a different IRX cycle (i.e., $Off_1$ and $On_1$, where $Off_1$ and/or $On_1$ are different from $Off_0$ and/or $On_0$, respectively). Furthermore, the UE may use $T_1$ to track how long the second IRX cycle (i.e., $Off_1$ and $On_1$) is used, where $T_1$ may track a different duration of time than $T_0$. In this example, $Off_1$ and $On_1$ are both longer than $Off_0$ and $On_0$, respectively. However in some embodiments, $Off_1$ or $On_1$ may have the same duration as $Off_0$ or $On_0$, respectively (e.g., $Off_0$ and $Off_1$ may be different, while $On_0$ and $On_1$ are the same). Similarly, in some embodiments, $T_0$ and $T_1$ may track the same duration.

As shown in FIG. 1, the UE may not receive any indications of traffic before the expiration of $T_1$ (e.g., during the three instances of $On_1$), and thus may transition to using the third cycle (i.e., $Off_2$ and $On_2$, where $Off_2$ and/or $On_2$ are different from $Off_0$, $Off_1$, $On_0$, and/or $On_1$, respectively). Further, the UE may use $T_2$ to track the time spent monitoring for traffic on the third cycle. In this example, the UE may receive a traffic indication (e.g., a grant, sent via the PDCCH) during the first instance of $On_2$, as indicated by the grey box in the figure. Because the UE has received the traffic indication during $T_2$, the UE may cease using $T_2$ (as indicated by the dashed line in the figure next to the text "Timer $T_2$"), and may reset to the initial cycle and associated timer (i.e., $Off_0$ and $On_0$, tracked by $T_0$, in this example).

Figure 2A:
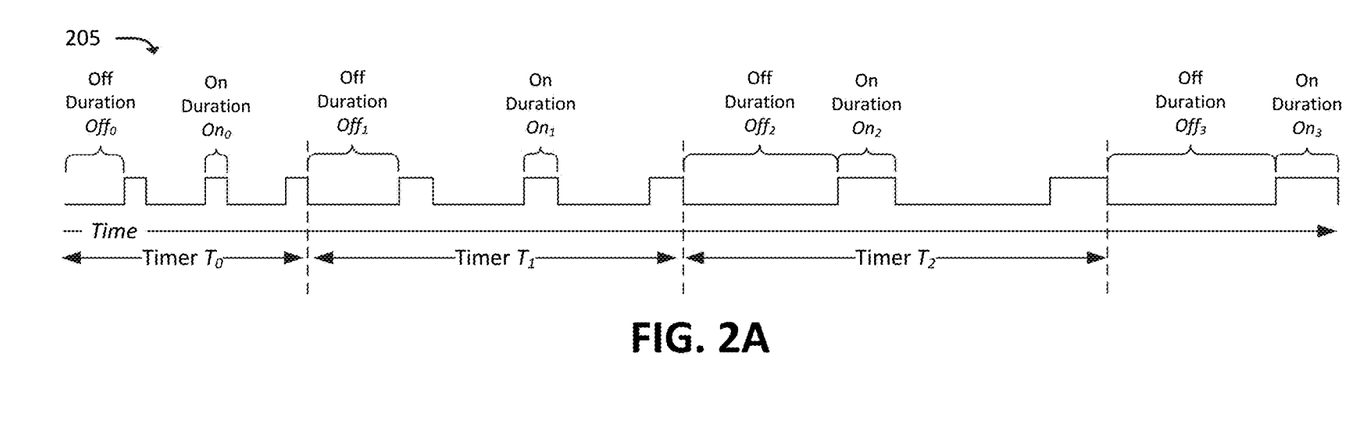
FIGS. 2A and 2B illustrate different IRX profiles that may be used by one or more different UEs, and/or by the same UE under different circumstances.
Figure 2B:
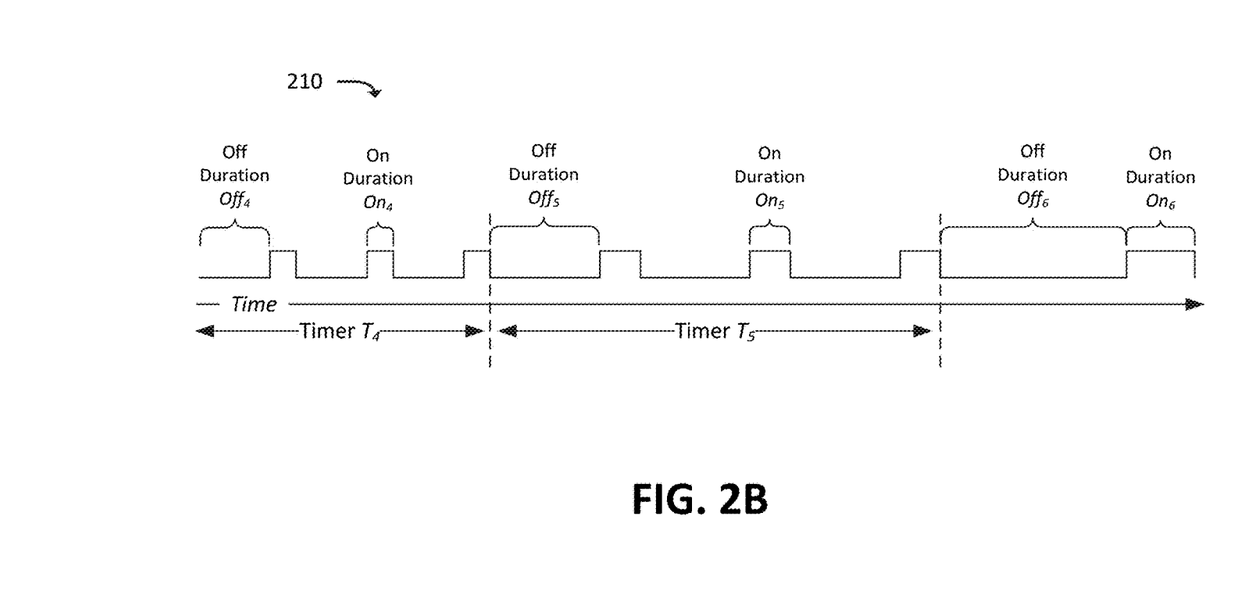

In some embodiments, different IRX profiles may be used for different UEs, and/or for the same UE in different situations. As discussed herein, an "IRX profile" may refer to a set of IRX cycles (i.e., a set of On/Off Durations) and associated timers. Some example factors that may be used to select a particular profile for a particular UE are discussed in greater detail below. FIGS. 2A and 2B illustrate two example IRX profiles 205 and 210, using a similar notation as used in FIG. 1.

For instance, IRX profile 205, shown in FIG. 2A, may have four IRX cycles and associated timers. As shown, the first IRX cycle of IRX profile 205 may have On/Off Durations $On_0$ and $Off_0$ and associated timer $T_0$, the second IRX cycle of IRX profile 205 may have On/Off Durations $On_1$ and $Off_1$ and associated timer $T_1$, the third IRX cycle of IRX profile 205 may have On/Off Durations $On_2$ and $Off_2$ and associated timer $T_2$, and the fourth IRX cycle of profile 205 may have On/Off Durations $On_3$ and $Off_3$. The fourth IRX cycle may not have an associated timer because the fourth IRX cycle is the final IRX cycle of IRX profile 205, and there is thus no next IRX cycle to use after the fourth IRX cycle expires.

IRX profile 210, shown in FIG. 2B, may be different from IRX profile 205. For instance, while IRX profile 205 specifies four IRX cycles and associated timers, example IRX profile 210 specifies three IRX cycles and associated timers. In practice, different IRX profiles may specify additional, fewer, and/or different IRX cycles and associated timers.

Figure 3:
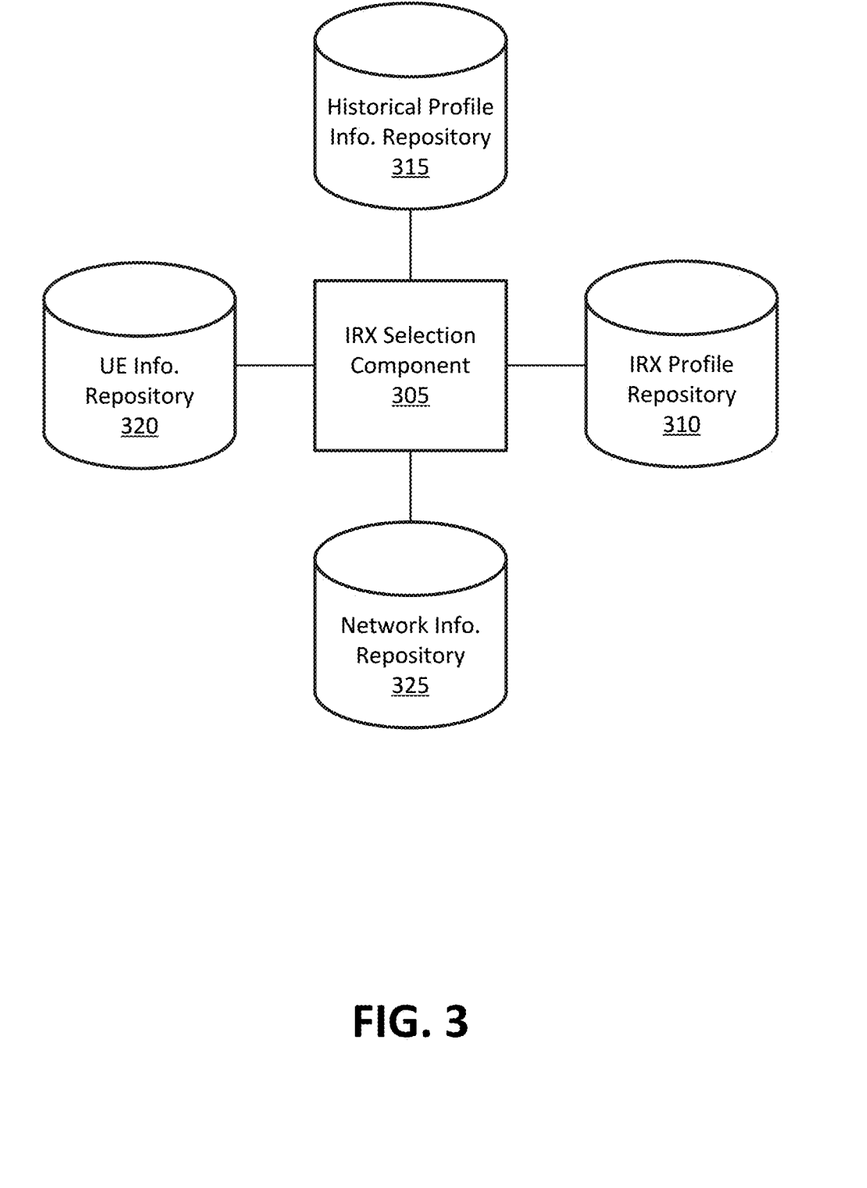
FIG. 3 illustrates example components that may facilitate the selection of an IRX profile for a particular UE, in accordance with some embodiments.

In some embodiments, the IRX profile for a given UE may be selected by an IRX selection component (e.g., IRX selection component 305, as shown in FIG. 3). IRX selection component 305 may use one or more information sources to select an IRX profile for a UE. For example, as shown in FIG. 3, IRX selection component 305 may be communicatively coupled with, and/or may include, IRX profile repository 310, historical profile information repository 315, UE information repository 320, and/or network information repository 325. In practice, IRX selection component 305 may communicate with (and/or may include) additional, fewer, and/or different devices and/or systems that store and/or provide suitable information for selecting or generating an IRX profile.

Figure 4:
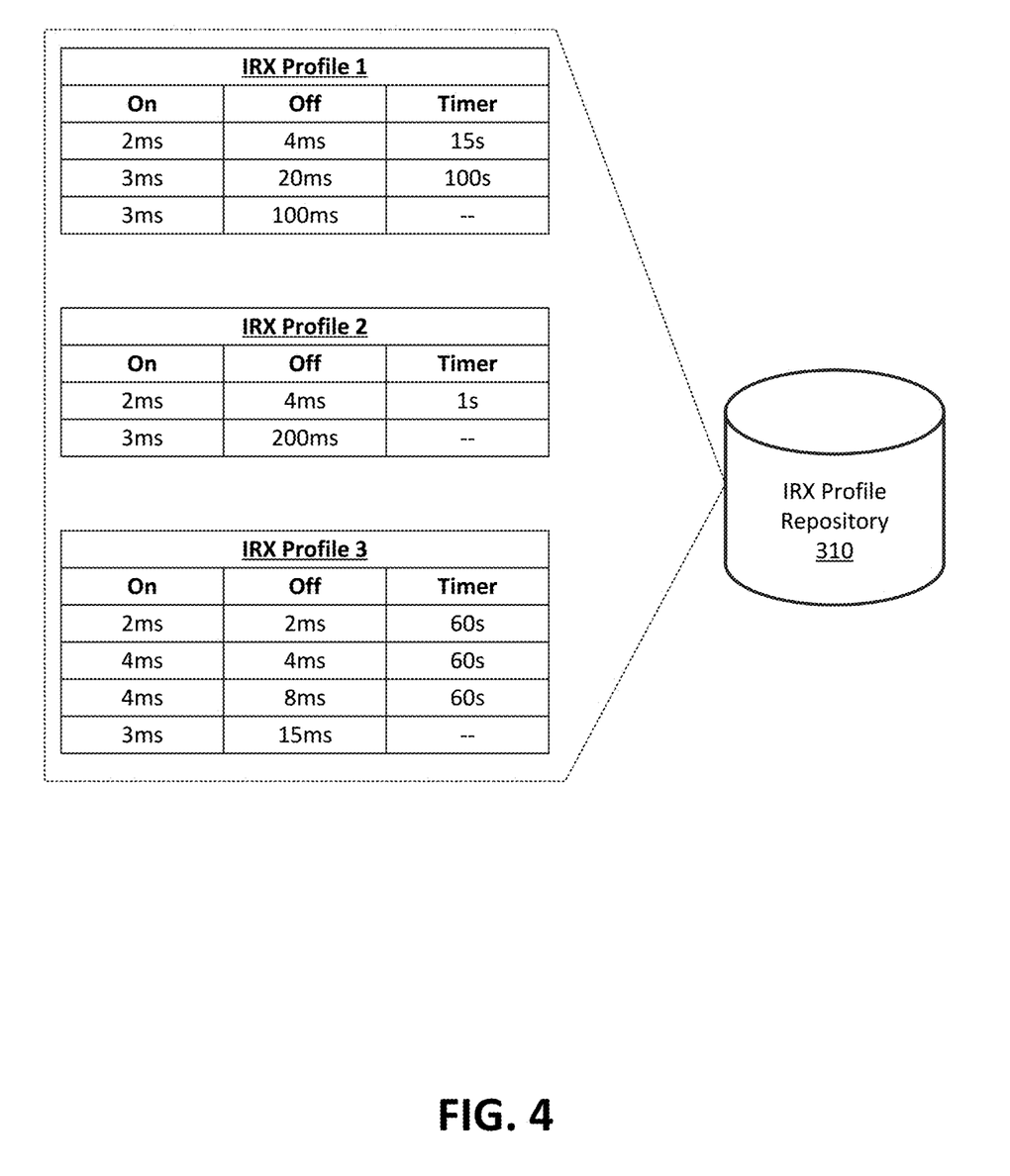
FIG. 4 illustrates an example data structure that may be used to represent multiple IRX profiles, in accordance with some embodiments.

IRX profile repository 310 may store one or more IRX profiles. FIG. 4 conceptually illustrates an example of different IRX profiles that may be stored by IRX profile repository 310. As mentioned above, different IRX profiles may be used for different UEs, and/or in different scenarios (e.g., based on the type of application or service that the UE is currently engaged in, time of day, location of the UE, and/or other scenarios). Three example IRX profiles are shown here (IRX Profiles 1-3). In practice, additional, fewer, or different IRX profiles may be available. Furthermore, this figure represents each IRX profile as a table. In practice, any other suitable data structure (e.g., a tree, an array, a linked list, a hash table, etc.) may be used to represent an IRX profile.

As shown, each IRX profile may include a set of IRX cycles (e.g., On Durations and Off Durations) and associated timers. The IRX profiles may indicate an order of the On/Off Durations and timers. For instance, the rows located at the tops of the respective tables may be the "first" or "initial" IRX cycles and timers, while the rows located at the bottoms of the respective tables may be the "last" IRX cycles and timers.

In this example, IRX Profile 1 may be associated with three sets of IRX cycles and timers: (1) On Duration of 2 milliseconds (ms), Off Duration of 4 ms, and timer of 15 seconds (s); (2) On Duration of 3 ms, Off Duration of 20 ms, and timer of 100 s; and (3) On Duration of 3 ms, Off Duration of 100 ms, and no timer. The last IRX cycle may not be associated with a timer, as there is no subsequent IRX cycle to utilize.

Returning to FIG. 3, historical profile information repository 315 may store information indicating IRX profiles that have been previously selected for one or more UEs. The information stored by historical profile information repository 315 may be received from IRX selection component 305 over time (e.g., as IRX selection component 305 selects IRX profiles for UEs, IRX selection component 305 may provide information describing attributes of the UEs, along with IRX profiles that were selected for the UEs), and/or from some other source. The information stored by historical profile information repository 315 may include historical attributes (e.g., attributes associated with UEs and/or with a RAN to which the UEs connected) based on which the IRX profiles have been selected. For instance, referring to FIG. 5, the historical attributes associated with a particular UE, for which historical profile information repository 315 stores information, may include UE device type, UE/subscriber historical activity, UE location information, recent traffic application/type, and/or network load (e.g., network conditions under which an IRX profile was historically selected for a given UE). In practice, additional, fewer, and/or different types of information may be used.

Figure 5:
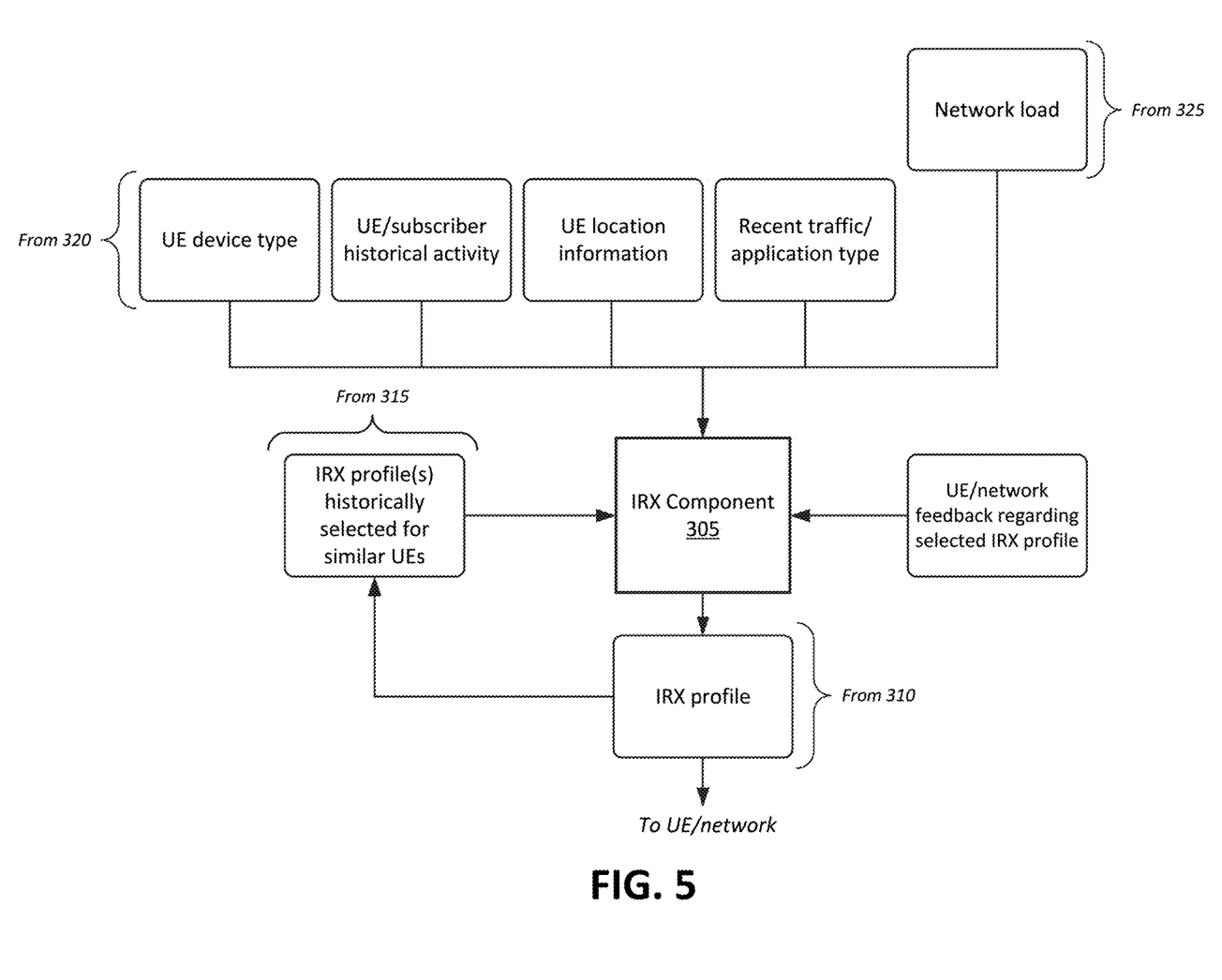
FIG. 5 conceptually illustrates example factors that may be used in the selection of an IRX profile for a given UE, in accordance with some embodiments.

While FIG. 5 shows these types of information as being provided by UE information repository 320, similar types of information may be stored and/or provided by historical profile information repository 315. That is, as described below, UE information repository 320 (and/or one or more other devices or systems, such as a UE for which an IRX profile is being selected and/or a base station of the RAN to which the UE is connected) may provide this information regarding a UE for which an IRX profile is being selected, and historical profile information repository 315 may provide similar types of information regarding one or more UEs for which an IRX profile has been selected in the past.

UE device type, for a given UE, may include a make and/or model of the UE, physical attributes of the UE (e.g., screen size, screen resolution, camera resolution, etc.), a classification of the device type (e.g., smartphone, tablet, machine-to-machine ("M2M") device, wearable device, etc.), and/or other attributes or descriptors of device type.

UE/subscriber historical activity may indicate information associated with device activity over time associated with the UE, such as times (e.g., time of the day, day of week, season, etc.) during which the UE was active or idle (e.g., times during which the UE actively sent and/or received traffic), times during which the UE was active for certain types of applications or services (e.g., times that the UE sent and/or received phone calls, times that the UE sent and/or received streaming audio/video traffic, etc.), geographical locations at which the UE was located at given times, and/or other historical information associated with the UE. In some embodiments, the UE/subscriber historical activity may include information associated with multiple UEs (e.g., where a particular subscriber is associated with multiple UEs, such as a smartphone, a tablet, wearable device, and/or other UEs).

UE location information may indicate a location of a particular UE at the time (e.g., contemporaneous with, or substantially contemporaneous with) that an IRX profile is to be selected for the UE. Recent traffic/application type may indicate a type of traffic or application (e.g., voice call traffic, streaming audio/video traffic, etc.) in which the UE is engaged at the time (e.g., contemporaneous with, or substantially contemporaneous with) that an IRX profile is to be selected for the UE.

Returning to FIG. 3, UE information repository 320 may store and/or provide attribute information associated with a given UE, for which an IRX profile is to be selected by IRX selection component 305. The types of information stored by UE information repository 320 may include some or all of the types of information enumerated above with respect to historical profile information repository 315, and/or other types of attributes that are relevant to the selection of an IRX profile. UE information repository 320 may receive the information from the UE, one or more network elements (e.g., a Unified Data Management function ("UDM"), a Home Subscriber Server ("HSS"), and/or some other device or system that stores and/or provides the information).

Network information repository 325 may store and/or provide network load and/or performance information. The information stored by network information repository 325 may be provided by a base station of a wireless network (e.g., an eNB or gNB to which the UE is connected, or is connecting to), the UE, and/or one or more other network elements (e.g., an Access and Mobility Management Function ("AMF"), a Mobility and Management Entity ("MME"), etc.). The information stored and/or provided by network information repository 325 may indicate a load of the base station (e.g., load and/or capacity of the eNB or gNB to which the UE is connected, or is connecting to), physical characteristics of a connection between the UE and the base station (e.g., a Received Signal Strength Indicator ("RSSI"), Signal-to-Interference-and-Noise-Ratio ("SINR"), etc.), performance metrics (e.g., latency and/or throughput of traffic between the UE and the base station), and/or other suitable information.

Returning again to FIG. 5, IRX selection component 305 may use information regarding a given UE and/or a base station to which the UE is connected or connecting to (e.g., as received from UE information repository 320 and/or network information repository 325) to select an IRX profile for the UE. For example, IRX selection component 305 may compare the attributes of the UE and/or the network load to mapping information that maps one or more IRX profiles to one or more UE attributes and/or measures of network load, and select an IRX profile based on the mapping. In some embodiments, IRX selection component 305 may compare historical attributes of UEs for which IRX profiles have previously been selected (e.g., as received from historical profile information repository 315), and identify similar UEs and/or network load conditions. IRX selection component 305 may use any suitable sort of similarity analysis, such as linear regression, classification, scoring, pattern matching, etc., in order to determine a measure of similarity between attributes of a UE, for which an IRX profile has been previously selected, and a UE for which an IRX profile is to be selected. In some embodiments, IRX selection component 305 may select an IRX profile based on an associated UE, for which the IRX profile was preciously selected, having a measure of similarity with the UE that exceeds a threshold measure of similarity. In some embodiments, IRX selection component 305 may select the IRX profile based on the associated UE having a highest measure of similarity to the UE, out of a set of UEs.

Based on the similarity analysis, IRX selection component 305 may select a particular IRX profile (e.g., as stored by IRX profile repository 310), and provide the selected IRX profile to the UE, and/or to one or more network elements (e.g., a base station to which the UE is connected, an AMF, an MME, and/or some other suitable network element). In some embodiments, IRX selection component 305 may provide the IRX profile via Radio Resource Control ("RRC") signaling, Non-Access Stratum ("NAS") signaling, and/or some other suitable signaling. In some embodiments, the IRX profile may be provided to the base station to which the UE is connected, which may provide the IRX profile to the UE. In some embodiments, the UE may previously store a set of IRX profiles, and the signaling to the UE may be an identifier of a particular IRX profile (e.g., as opposed to providing raw values associated with the IRX profile, such as the IRX cycle and/or associated timers).

IRX selection component 305 may also provide the selected IRX profile to historical profile information repository 315, along with some or all of the identified attributes of the UE and/or network. This information may be used during subsequent selections of IRX profiles (e.g., for the same UE, or for UEs with similar attributes). Furthermore, IRX selection component 305 may received feedback information (e.g., from the UE and/or one or more network components, such as a base station to which the UE is connected) regarding the selected IRX profile. The feedback information may generally indicate UE activity according to the selected IRX profile. For example, the feedback information may indicate how many times one or more timers expired, how long a particular IRX cycle was used by the UE (e.g., in comparison to other IRX cycles of the IRX profile), and/or other UE activity information that is related to the IRX profile.

This feedback information may be used by IRX selection component 305 in a subsequent selection of an IRX profile (e.g., in selecting a new IRX profile for the UE, and/or when selecting an IRX profile for another UE). For instance, if the selected IRX profile includes a IRX cycle with relatively short durations and the UE does not frequently use this IRX cycle (e.g., a timer associated with this IRX cycle frequently expires, and another IRX cycle is used by the UE), the feedback information may indicate that the UE uses the first IRX cycle relatively infrequently. During a subsequent selection of an IRX profile (e.g., for the same UE or for a UE with similar attributes), IRX selection component 305 may select a different IRX profile (e.g., an IRX profile that does not include the first IRX cycle, and/or includes the first IRX cycle with a shorter timer, such that the second IRX cycle is transitioned to more quickly).

In some embodiments, the feedback information may include performance information (e.g., a throughput and/or latency of traffic sent between the UE and the network). If this performance information does not exceed a particular threshold, IRX selection component 305 may select a more "aggressive" IRX profile in the future (e.g., for the same UE and/or for UEs sharing similar attributes), which includes shorter On/Off Durations and/or timers.

In some embodiments, the feedback information may include, and/or may be based on, subjective feedback provided by a user (e.g., a user of the UE for which the IRX profile was selected). For example, the feedback information may include a response to a survey inquiring the user's satisfaction with the performance of the UE, such as a rating (e.g., number of stars, numerical score, thumbs up/down, etc.).

In some embodiments, IRX selection component 305 may modify existing IRX profiles based on the feedback information, and may refine IRX profiles in an ongoing process (e.g., comparing performance and/or other metrics to thresholds, and determining whether particular adjustments or refinements improve the performance and/or other metrics). IRX selection component 305 may use machine learning and/or other suitable techniques to continuously modify IRX profiles, and/or to select appropriate existing IRX profiles for UEs with particular attributes.

Figure 6:
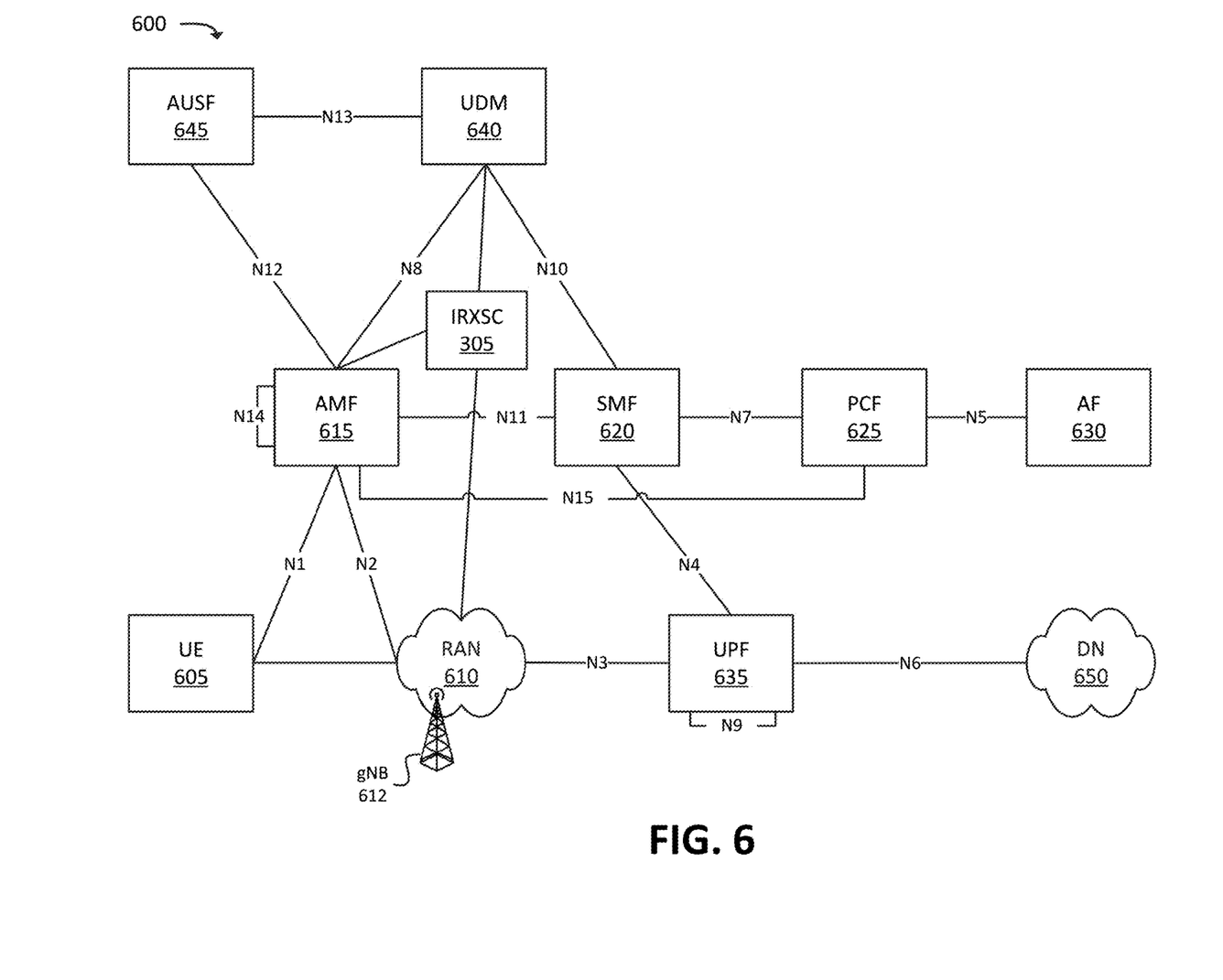
FIG. 6 illustrates an example environment in which one or more embodiments, described herein, may be implemented.

FIG. 6 illustrates an example environment 600 in which one or more embodiments may be implemented. In some embodiments, environment 600 may correspond to a Fifth Generation ("5G") network, and/or may include elements of a 5G network. As shown, environment 600 may include UE 605, RAN 610 (which may include one or more gNBs 612), AMF 615, Session Management Function ("SMF") 620, Policy Control Function ("PCF") 625, Application Function ("AF") 630, User Plane Function ("UPF") 635, UDM 640, Authentication Server Function ("AUSF") 645, Data Network ("DN") 650, and IRX selection component 305.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 605 may include a computation and communication device, such as a wireless mobile communication device that is capable of communicating with RAN 610 and/or DN 650. UE 605 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, or another type of mobile computation and communication device. UE 605 may send traffic to and/or receive traffic (e.g., user plane traffic) from DN 650 via RAN 610 and UPF 635.

RAN 610 may be, or may include, a 5G RAN that includes one or more base stations (e.g., one or more gNBs 612), via which UE 605 may communicate with one or more other elements of environment 600. UE 605 may communicate with RAN 610 via an air interface (e.g., as provided by gNB 612). For instance, RAN 610 may receive traffic (e.g., voice call traffic, data traffic, messaging traffic, signaling traffic, etc.) from UE 605 via the air interface, and may communicate the traffic to UPF 635, and/or one or more other devices or networks. Similarly, RAN 610 may receive traffic intended for UE 605 (e.g., from UPF 635, AMF 615, and/or one or more other devices or networks) and may communicate the traffic to UE 605 via the air interface.

AMF 615 may include one or more devices, systems, Virtualized Network Functions ("VNFs"), etc., that perform operations to register UE 605 with the 5G network, to establish bearer channels associated with a session with UE 605, to hand off UE 605 from the 5G network to another network, to hand off UE 605 from the other network to the 5G network, and/or to perform other operations. In some embodiments, the 5G network may include multiple AMFs 615, which communicate with each other via the N14 interface (denoted in FIG. 6 by the line marked "N14" originating and terminating at AMF 615).

SMF 620 may include one or more devices, systems, VNFs, etc., that gather, process, store, and/or provide information in a manner described herein. SMF 620 may, for example, facilitate in the establishment of communication sessions on behalf of UE 605. In some embodiments, the establishment of communications sessions may be performed in accordance with one or more policies provided by PCF 625.

PCF 625 may include one or more devices, systems, VNFs, etc., that aggregate information to and from the 5G network and/or other sources. PCF 625 may receive information regarding policies and/or subscriptions from one or more sources, such as subscriber databases and/or from one or more users (such as, for example, an administrator associated with PCF 625).

AF 630 may include one or more devices, systems, VNFs, etc., that receive, store, and/or provide information that may be used in determining parameters (e.g., quality of service parameters, charging parameters, or the like) for certain applications.

UPF 635 may include one or more devices, systems, VNFs, etc., that receive, store, and/or provide data (e.g., user plane data). For example, UPF 635 may receive user plane data (e.g., voice call traffic, data traffic, etc.), destined for UE 605, from DN 650, and may forward the user plane data toward UE 605 (e.g., via RAN 610, SMF 620, and/or one or more other devices). In some embodiments, multiple UPFs 635 may be deployed (e.g., in different geographical locations), and the delivery of content to UE 605 may be coordinated via the N9 interface (e.g., as denoted in FIG. 5 by the line marked "N9" originating and terminating at UPF 635). Similarly, UPF 635 may receive traffic from UE 605 (e.g., via RAN 610, SMF 620, and/or one or more other devices), and may forward the traffic toward DN 650. In some embodiments, UPF 635 may communicate (e.g., via the N4 interface) with SMF 620, regarding user plane data processed by UPF 635.

AUSF 645 and UDM 640 may include one or more devices, systems, VNFs, etc., that manage, update, and/or store, in one or more memory devices associated with AUSF 645 and/or UDM 640, profile information associated with a subscriber. AUSF 645 and/or UDM 640 may perform authentication, authorization, and/or accounting operations associated with the subscriber and/or a communication session with UE 605.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 605 may communicate, through DN 650, with data servers, other UEs 605, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 605 may communicate.

IRX selection component 305 (shown in the figure as "IRXSC") may include one or more devices, systems, VNFs, etc., that perform one or more functions described herein. For example, IRX selection component 305 may communicate with UDM 640 and/or one or more other devices or systems to identify information and/or attributes associated with UE 605. IRX selection component 305 may include and/or communicate with one or more other information sources and/or repositories (e.g., one or more other devices or systems, not shown, that implement one or more of IRX profile repository 310, historical profile information repository 315, UE information repository 320, and/or network information repository 325) to gather information relevant to selecting an IRX profile for UE 605, may select, generate, and/or modify an IRX profile based on the information, and may provide the IRX profile to UE 605. In some embodiments, some or all of the functionality of IRX selection component 305 may be implemented by UE 605. For example, UE 605 may be configured to receive information relevant to selecting an IRX profile, and may select the IRX profile.

Figure 7:
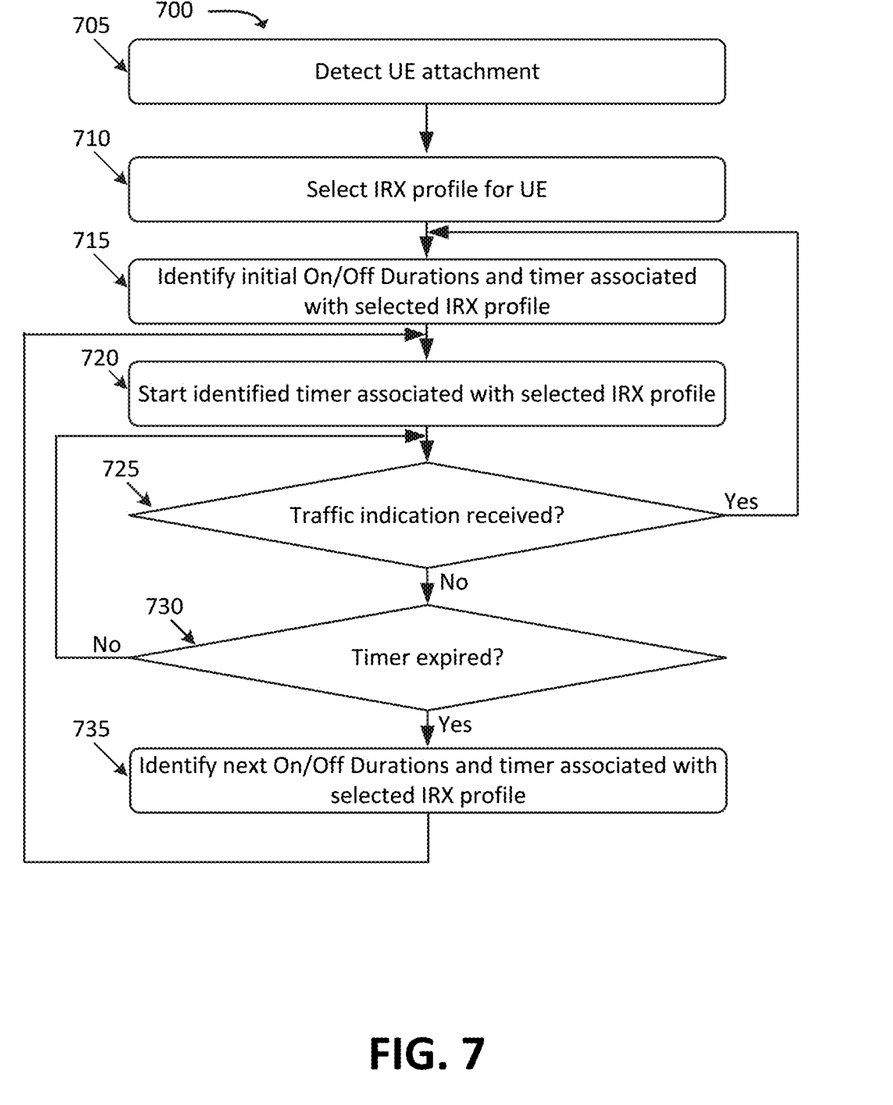
FIG. 7 illustrates an example flowchart for implementing IRX, in accordance with some embodiments, at a UE and/or one or more components of a RAN to which the UE is connected.

FIG. 7 illustrates an example process 700 for performing IRX in accordance with some embodiments described herein. In some embodiments, process 700 may be performed by UE 605. For example, as mentioned above, some or all of the functionality of IRX selection component 305 may be implemented by UE 605, and/or UE 605 may be otherwise communicatively coupled to IRX selection component 305. In some embodiments, process 700 may be performed by gNB 612. In some embodiments, some or all of process 700 may be performed by UE 605 and gNB 612. For example, UE 605 and gNB 612 may both perform some or all of process 700 in a synchronized manner, such that UE 605 and gNB 612 both identify an IRX profile for UE 605. Based on knowledge of the profile associated with UE 605, gNB 612 may output traffic indications (e.g., grants, sent via the PDCCH) at times that UE 605 is configured to be "awake" or monitoring the PDCCH, as indicated by a given profile associated with UE 605. UE 605, gNB 612, and/or one or more other devices or systems may communicate (e.g., via RRC signaling and/or some other suitable signaling) to ensure that UE 605 and gNB 612 maintain synchronized timing information, such that gNB 612 time-aligns sending grants with times at which UE 605 is monitoring the PDCCH (e.g., during the On Duration of a given IRX cycle). For the sake of clarity, process 700 is described below in the context of being performed by UE 605.

As shown, process 700 may include detecting (at 705) the attachment of UE 605 to gNB 612. Process 700 may also include selecting (at 710) an IRX profile for UE 605. For example, UE 605 may determine that UE 605 has attached to gNB 612, and that an IRX profile should be selected for UE 605. In some embodiments, UE 605 may select an appropriate IRX profile in a similar manner as discussed above (e.g., with respect to FIG. 5). For example, the IRX profile may be selected based on historical information associated with one or more other UEs (e.g., IRX profiles selected for UEs with similar attributes as UE 605). Additionally, or alternatively, IRX selection component 305 may receive an indication (e.g., from gNB 612, AMF 515, and/or some other device or system) that UE 605 has attached to gNB 612, and may select an appropriate IRX profile for UE 605 (e.g., in situations where UE 605 does not internally implement the appropriate functionality of IRX selection component 305).

Process 700 may additionally include identifying (at 715) initial On and Off Durations (e.g., an initial IRX cycle), as well as an associated timer, indicated by the selected IRX profile. As discussed above, an IRX profile may indicate an ordered set of On/Off Durations and corresponding timers, of which UE 605 may identify an initial set.

Process 700 may further include starting (at 720) the identified timer associated with the selected IRX profile. For instance, UE 605 may begin performing in accordance with the IRX profile (e.g., sleep for the indicated initial Off Duration, monitor the PDCCH for the indicated initial On Duration, and repeat as applicable), and may track how long UE 605 has been sleeping or monitoring the PDCCH based on the initial On and Off Durations.

Process 700 may also include determining (at 725) whether a traffic indication (or grant) has been received (e.g., via the PDCCH) during a given On Duration while the timer is running. If a traffic indication has been received (at 725—YES), then process 700 may return to block 715. That is, the initial On/Off Durations and associated timer may be identified and implemented.

If a traffic indication has not been received (at 725—NO), then process 700 may additionally include determining (at 730) whether the timer has expired. If the timer has not expired (at 730—NO), then process 700 may include continuing to monitor for traffic indications according to the current On/Off Durations.

If the timer has expired (at 730—YES), then process 700 may further include identifying (at 735) a next On and/or Off Duration and timer associated with the selected IRX profile. For example, if the expired timer is associated with an initial On/Off Duration associated with the IRX profile, UE 605 may identify the next On/Off Duration and associated timer indicated in the IRX profile, and process 700 may return to block 720 (using the identified next On/Off Duration and associated timer).

Figure 8:
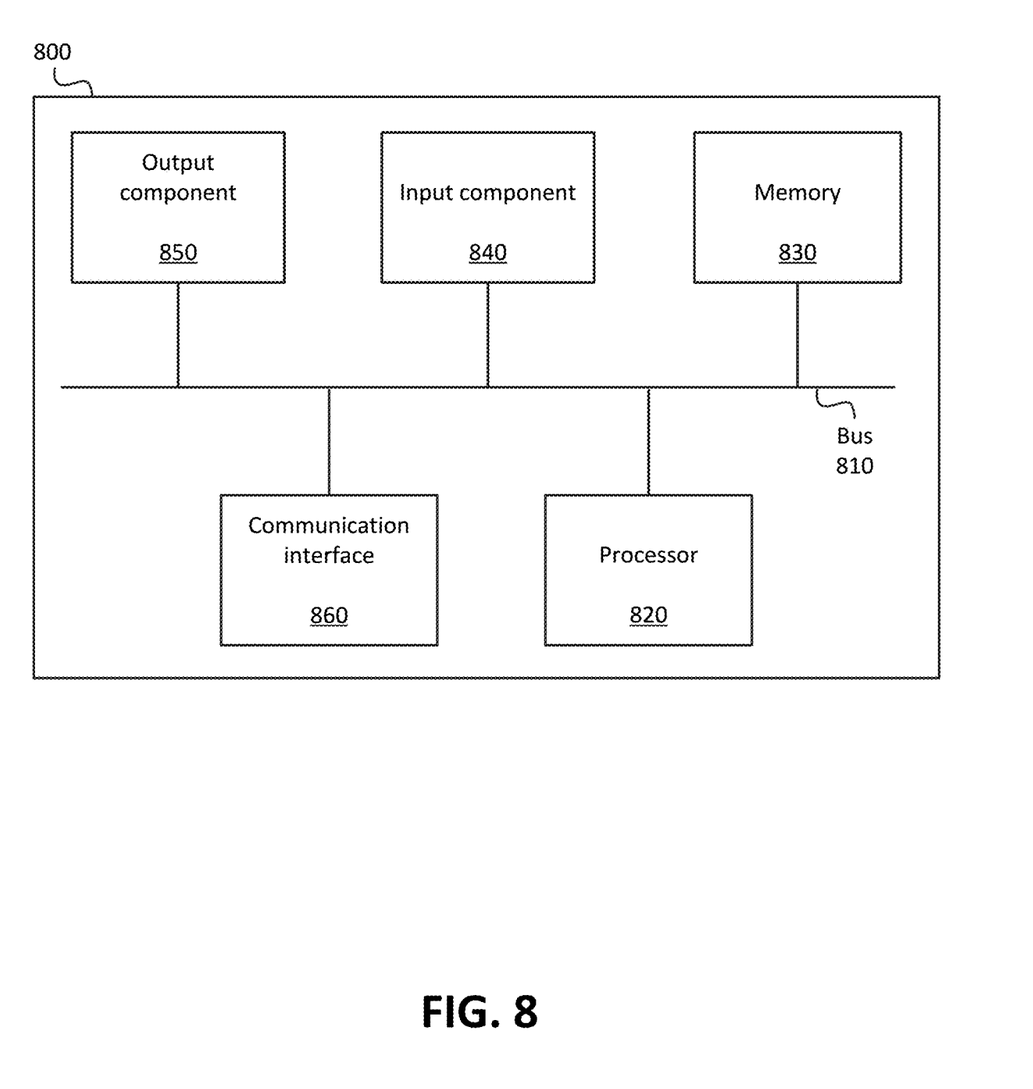
FIG. 8 illustrates example functional components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 5 and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
   identify an attachment of a User Equipment ("UE") to a base station of a wireless network;
   identify at least one other UE based on comparing one or more attributes of the at least one other UE to one or more attributes of the UE;
   identify that a particular profile has been previously selected for the at least one other UE;
   select the particular profile, out of a plurality of candidate profiles, for the UE based on identifying that the particular profile has been previously selected for the at least one other UE, wherein each profile, of the plurality of candidate profiles, specifies:
   a plurality of cycles associated with intermittently monitoring a wireless channel, between the UE and the base station, for a traffic indication from the base station, wherein a particular cycle specifies:
   an On Duration, during which the UE is to monitor the wireless channel for the traffic indication from the base station, and
   an Off Duration, during which the UE is to refrain from monitoring the wireless channel for the traffic indication from the base station, and
   one or more timers respectively associated with one or more of the plurality of cycles; and provide the selected particular profile to the UE, wherein providing the selected particular profile to the UE causes the UE to implement the selected particular profile, by:
  monitoring the wireless channel for the traffic indication for a first duration of time that is based on a first On Duration, associated with a first cycle of the plurality of cycles associated with the selected particular profile,
  subsequent to monitoring the wireless channel for the first duration of time, ceasing to monitor the wireless channel for a second duration of time that is based on a first Off Duration, associated with the first cycle,
  subsequent to the first and second durations of time, determining that a timer, associated with the first cycle, has expired, and
  subsequent to determining that the timer associated with the first cycle has expired, monitoring the wireless channel for the traffic indication for a third duration of time that is based on a second On Duration, associated with a second cycle of the plurality of cycles associated with the selected particular profile, the third duration of time being different from the first duration of time.

2. The device of claim 1, wherein executing the processor-executable instructions, to select the at least one UE, further causes the one or more processors to:
  determine a measure of similarity between the at least one UE and the UE; and
  determine that the measure of similarity exceeds a threshold measure of similarity.

3. The device of claim 1, wherein executing the processor-executable instructions, to select the at least one UE, further causes the one or more processors to:
  determine a measure of similarity between each UE, of a set of candidate UEs, and the UE; and
  determine that the at least one UE has a highest measure of similarity to the UE, out of the set of candidate UEs.

4. The device of claim 1, wherein the first and second cycles are respectively associated with two different timers having two different durations.

5. The device of claim 1, wherein providing the selected particular profile to the UE further causes the UE to:
  determine, during a particular On Duration associated with the second cycle, that the traffic indication has been received; and
  based on determining that the traffic indication has been received during the On Duration associated with the second cycle:
    cease monitoring the wireless channel in accordance with the second On Duration and the second Off Duration; and
    monitor the wireless channel for a subsequent traffic indication in accordance with the first On Duration and the first Off Duration in lieu of the second On Duration and the second Off Duration.

6. The device of claim 1, wherein the timer associated with the first On Duration and the first Off Duration is a first timer, and wherein the selected particular profile specifies at least:
  the first On Duration,
  the first Off Duration,
  the first timer,
  the second On Duration,
  a second Off Duration during which the UE is to refrain from monitoring the wireless channel for the traffic indication,
  a second timer associated with the second On Duration and second Off Duration, wherein expiration of the timer causes the UE to cease monitoring the channel in accordance with the second On Duration and the second Off duration,
  a third On Duration during which the UE is to monitor the wireless channel for the traffic indication, and
  a third Off Duration during which the UE is to refrain from monitoring the wireless channel for the traffic indication.

7. The device of claim 1, wherein executing the processor-executable instructions, to compare the one or more attributes of the at least one other UE to the one or more attributes of the UE, include processor-executable instructions to perform at least one of:
  comparing a device type of the UE to a device type of the at least one other UE,
  comparing location information associated with the UE to location information associated with the at least one other UE, or
  comparing a traffic type associated with the UE to a traffic type associated with the at least one other UE.

8. A non-transitory computer-readable medium, storing a plurality of processor-executable instructions, which, when executed by one or more processors, causes the one or more processors to:
  identify an attachment of a User Equipment ("UE") to a base station of a wireless network;
  identify at least one other UE based on comparing one or more attributes of the at least one other UE to one or more attributes of the UE;
  identify that a particular profile has been previously selected for the at least one other UE;
  select the particular profile, out of a plurality of candidate profiles, for the UE based on identifying that the particular profile has been previously selected for the at least one other UE, wherein each profile, of the plurality of candidate profiles, specifies:
    a plurality of cycles associated with intermittently monitoring a wireless channel, between the UE and the base station, for a traffic indication from the base station, wherein a particular cycle specifies:
      an On Duration, during which the UE is to monitor the wireless channel for the traffic indication from the base station, and
      an Off Duration, during which the UE is to refrain from monitoring the wireless channel for the traffic indication from the base station, and
    one or more timers respectively associated with one or more of the plurality of cycles; and
  provide the selected particular profile to the UE, wherein providing the selected particular profile to the UE causes the UE to implement the selected particular profile, by:
    monitoring the wireless channel for the traffic indication for a first duration of time that is based on a first On Duration, associated with a first cycle of the plurality of cycles associated with the selected particular profile,
    subsequent to monitoring the wireless channel for the first duration of time, ceasing to monitor the wireless channel for a second duration of time that is based on a first Off Duration, associated with the first cycle, subsequent to the first and second durations of time, determining that a timer, associated with the first cycle, has expired, and subsequent to determining that the timer associated with the first cycle has expired, monitoring the wireless channel for the traffic indication for a third duration of time that is based on a second On Duration, associated with a second cycle of the plurality of cycles associated with the selected particular profile, the third duration of time being different from the first duration of time.

9. The non-transitory computer-readable medium of claim 8, wherein the processor-executable instructions, to select the at least one UE, further include processor-executable instructions to:

determine a measure of similarity between the at least one UE and the UE; and determine that the measure of similarity exceeds a threshold measure of similarity.

10. The non-transitory computer-readable medium of claim 8, wherein the processor-executable instructions, to select the at least one UE, further include processor-executable instructions to:

determine a measure of similarity between each UE, of a set of candidate UEs, and the UE; and determine that the at least one UE has a highest measure of similarity to the UE, out of the set of candidate UEs.

11. The non-transitory computer-readable medium of claim 8, wherein the first and second cycles are respectively associated with two different timers having two different durations.

12. The non-transitory computer-readable medium of claim 8, wherein providing the selected particular profile to the UE further causes the UE to:

determine, during a particular On Duration associated with the second cycle, that the traffic indication has been received; and based on determining that the traffic indication has been received during the On Duration associated with the second cycle:

cease monitoring the wireless channel in accordance with the second On Duration and the second Off Duration; and monitor the wireless channel for a subsequent traffic indication in accordance with the first On Duration and the first Off Duration in lieu of the second On Duration and the second Off Duration.

13. The non-transitory computer-readable medium of claim 8, wherein the timer associated with the first On Duration and the first Off Duration is a first timer, and wherein the selected particular profile specifies at least:

the first On Duration, the first Off Duration, the first timer, the second On Duration, a second Off Duration during which the UE is to refrain from monitoring the wireless channel for the traffic indication, a second timer associated with the second On Duration and second Off Duration, wherein expiration of the timer causes the UE to cease monitoring the channel in accordance with the second On Duration and the second Off duration, a third On Duration during which the UE is to monitor the wireless channel for the traffic indication, and a third Off Duration during which the UE is to refrain from monitoring the wireless channel for the traffic indication.

14. The non-transitory computer-readable medium of claim 8, wherein the processor-executable instructions to compare the one or more attributes of the at least one other UE to the one or more attributes of the UE, further include processor-executable instructions to perform at least one of:

comparing a device type of the UE to a device type of the at least one other UE, comparing location information associated with the UE to location information associated with the at least one other UE, or comparing a traffic type associated with the UE to a traffic type associated with the at least one other UE.

15. A method, comprising:

identifying an attachment of a User Equipment ("UE") to a base station of a wireless network;

identifying at least one other UE based on comparing one or more attributes of the at least one other UE to one or more attributes of the UE;

identifying that a particular profile has been previously selected for the at least one other UE;

selecting the particular profile, out of a plurality of candidate profiles, for the UE based on identifying that the particular profile has been previously selected for the at least one other UE, wherein each profile, of the plurality of candidate profiles, specifies:

a plurality of cycles associated with intermittently monitoring a wireless channel, between the UE and the base station, for a traffic indication from the base station, wherein a particular cycle specifies:

an On Duration, during which the UE is to monitor the wireless channel for the traffic indication from the base station, and an Off Duration, during which the UE is to refrain from monitoring the wireless channel for the traffic indication from the base station, and one or more timers respectively associated with one or more of the plurality of cycles; and providing the selected particular profile to the UE, wherein providing the selected particular profile to the UE causes the UE to implement the selected particular profile, by:

monitoring the wireless channel for the traffic indication for a first duration of time that is based on a first On Duration, associated with a first cycle of the plurality of cycles associated with the selected particular profile, subsequent to monitoring the wireless channel for the first duration of time, ceasing to monitor the wireless channel for a second duration of time that is based on a first Off Duration, associated with the first cycle, subsequent to the first and second durations of time, determining that a timer, associated with the first cycle, has expired, and subsequent to determining that the timer associated with the first cycle has expired, monitoring the wireless channel for the traffic indication for a third duration of time that is based on a second On Duration, associated with a second cycle of the plurality of cycles associated with the selected particular profile, the third duration of time being different from the first duration of time.

16. The method of claim 15, wherein selecting the at least one UE further includes:
- determining a measure of similarity between each UE, of a set of candidate UEs, and the UE; and
- determining that the at least one UE has a highest measure of similarity to the UE, out of the set of candidate UEs.

17. The method of claim 15, wherein the first and second cycles are respectively associated with two different timers having two different durations.

18. The method of claim 15, wherein providing the selected particular profile to the UE further causes the UE to:
- determine, during a particular On Duration associated with the second cycle, that the traffic indication has been received; and
- based on determining that the traffic indication has been received during the On Duration associated with the second cycle:
  - cease monitoring the wireless channel in accordance with the second On Duration and the second Off Duration; and
  - monitor the wireless channel for a subsequent traffic indication in accordance with the first On Duration and the first Off Duration in lieu of the second On Duration and the second Off Duration.

19. The method of claim 15, wherein the timer associated with the first On Duration and the first Off Duration is a first timer, and wherein the selected particular profile specifies at least:
- the first On Duration,
- the first Off Duration,
- the first timer,
- the second On Duration,
- a second Off Duration during which the UE is to refrain from monitoring the wireless channel for the traffic indication,
- a second timer associated with the second On Duration and second Off Duration, wherein expiration of the timer causes the UE to cease monitoring the channel in accordance with the second On Duration and the second Off duration,
- a third On Duration during which the UE is to monitor the wireless channel for the traffic indication, and
- a third Off Duration during which the UE is to refrain from monitoring the wireless channel for the traffic indication.

20. The method of claim 15, wherein comparing the one or more attributes of the at least one other UE to the one or more attributes of the UE includes at least one of:
- comparing a device type of the UE to a device type of the at least one other UE,
- comparing location information associated with the UE to location information associated with the at least one other UE, or
- comparing a traffic type associated with the UE to a traffic type associated with the at least one other UE.

* * * * *